United States Patent [19]
Zeller et al.

[11] Patent Number: 5,623,633
[45] Date of Patent: Apr. 22, 1997

[54] CACHE-BASED COMPUTER SYSTEM EMPLOYING A SNOOP CONTROL CIRCUIT WITH WRITE-BACK SUPPRESSION

[75] Inventors: Charles P. Zeller; Darius D. Gaskins, both of Austin, Tex.

[73] Assignee: Dell USA, L.P., Austin, Tex.

[21] Appl. No.: 98,173

[22] Filed: Jul. 27, 1993

[51] Int. Cl.$^6$ ................................................. G06F 12/08
[52] U.S. Cl. ........................ 395/473; 395/470; 395/471
[58] Field of Search ............................ 364/200 MS File, 364/900 MS File; 395/400, 425, 468, 470, 473, 471, 472, 445, 440, 446, 447, 448, 457, 462

[56] References Cited

U.S. PATENT DOCUMENTS

| | | | |
|---|---|---|---|
| 5,072,369 | 12/1991 | Theus et al. | 395/473 |
| 5,091,845 | 2/1992 | Rubinfeld | 395/425 |
| 5,091,846 | 2/1992 | Sachs et al. | 395/425 |
| 5,119,485 | 6/1992 | Ledbetter, Jr. et al. | 395/425 |
| 5,155,824 | 10/1992 | Edenfield et al. | 395/425 |
| 5,313,609 | 5/1994 | Baylor et al. | 395/425 |
| 5,420,994 | 5/1995 | King et al. | 395/471 |
| 5,485,592 | 1/1996 | Lau | 395/470 |

*Primary Examiner*—Eddie P. Chan
*Assistant Examiner*—Hiep T. Nguyen
*Attorney, Agent, or Firm*—Skjerven, Morrill, MacPherson, Franklin & Friel; Stephen A. Terrile

[57] ABSTRACT

A cache-based computer system is provided with a snoop control circuit that implements a write-back suppression technique. The snoop control circuit controls the write-back and invalidation of dirty data within a cache memory during a DMA write operation to maintain the integrity of data within the computer system. If an alternate bus master initiates a burst transfer cycle that does not encompass an entire line of valid data, the alternate bus master asserts a snoop write-back signal that causes the snoop control circuit to effectuate the write-back to system memory of a corresponding dirty line in the cache memory. Integrity of the data within the system is thereby maintained. On the other hand, if the alternate bus master initiates a burst transfer cycle that does encompass an entire line of valid data, the alternate bus master deasserts the snoop write-back signal. When the snoop write-back signal is deasserted, the snoop control circuit advantageously suppresses the write-back of the corresponding dirty data in the cache memory, thereby attaining reduced traffic on the system bus. Since the DMA operation involved the transfer of an entire line of valid data, the integrity of data is maintained even though the write-back of the dirty line was suppressed. As a result, the bandwidth of the computer system may be improved and the overall performance of the system may be enhanced.

8 Claims, 10 Drawing Sheets

CACHE-BASED COMPUTER SYSTEM EMPLOYING A SNOOP CONTROL CIRCUIT WITH WRITE-BACK SUPPRESSION

BACKGROUND OF THE INVENTION

1. Field of the Invention

This invention relates to cache-based computer systems and, more particularly, to cache-based computer systems that include cache write-back mechanisms for maintaining the integrity of data during bus snooping transactions.

2. Description of the Relevant Art

Cache memory subsystems are prevalent within modem-day computer systems and are well known. Exemplary cache memory subsystems are described in a host of publications of the known prior art including, for example, U.S. Pat. Nos. 5,091,875 to Rubinfeld and 5,091,846 to Sachs et al.

A cache memory is a high-speed memory unit interposed in the memory hierarchy of a computer system between a slower system memory and a microprocessor to improve effective memory transfer rates and accordingly improve system performance. The name refers to the fact that the small memory unit is essentially hidden and appears transparent to the user, who is aware only of a larger system memory. The cache is usually implemented by semiconductor memory devices having speeds that are compatible with the speed of the processor, while the system memory utilizes a less costly, lower-speed technology. The cache concept anticipates the likely reuse by the microprocessor of selected data in system memory by storing a copy of the selected data in the cache memory.

A cache memory typically includes a plurality of memory sections, wherein each memory section stores a block or a "line" of two or more words. Each line has associated with it an address tag that uniquely identifies which line of system memory it is a copy of. When a read request originates in the processor for a new word, whether it be data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and stored in the cache memory. The requested word is simultaneously supplied to the processor. This event is referred to as a cache read "miss".

When the processor desires to write data to memory, a similar address tag comparison is made to determine whether the line into which data is to be written resides in the cache memory. If not present, the line is either fetched into the cache memory from system memory or the data is written directly into the system memory. This event is referred to as a cache write "miss". If the line is present, the data is written directly into the cache memory. This event is referred to as a cache write "hit". As will be explained in greater detail below, in many systems a data "dirty bit" for the cache line is then set. The dirty bit indicates that data stored within the line is dirty (i.e., has been modified and is inconsistent with system memory), and thus, before the line is deleted from the cache memory or overwritten, the modified data must be written back to system memory.

Since the cache is of limited size, space must often be allocated within the cache to accommodate a new line of data. An algorithm based on history of use is typically implemented to identify the least necessary line to be overwritten by the new line. A line which is overwritten or copied out of the cache memory when new data is stored in the cache memory is referred to as a victim block or a victim line.

One aspect that affects cache performance and design complexity is the handling of writes initiated by the processor or by an alternate bus master. As explained previously, because two copies of a particular piece of data or instruction code can exist, one in system memory and a duplicate copy in the cache, writes to either the system memory or the cache memory can result in an incoherence between the two storage units. For example, consider the case in which the same data is initially stored at a predetermined address in both the cache memory and the system memory. If the processor subsequently initiates a write cycle to store a new data item at the predetermined address, a cache write "hit" occurs and the processor proceeds to write the new data into the cache memory at the predetermined address. Since the data is modified in the cache memory but not in system memory, the cache memory and system memory become incoherent. Similarly, in systems with an alternate bus master, direct memory access (DMA) write cycles to system memory by the alternate bus master modify data in system memory but not in the cache memory. Again, the cache memory and system memory become incoherent.

An incoherence between the cache memory and system memory during processor writes can be prevented or handled by implementing one of several commonly employed techniques. In a first technique, a "write-through" cache guarantees consistency between the cache memory and system memory by writing the same data to both the cache memory and system memory. The contents of the cache memory and system memory are always identical, and so the two storage systems are always coherent. In a second technique, a "write-back" cache handles processor writes by writing only to the cache memory and setting a "dirty" bit to indicate cache entries which have been altered by the processor. When "dirty" or altered cache entries are later replaced during a "cache replacement" cycle, the modified data is written back into system memory.

An incoherence between the cache memory and system memory during a DMA write operation is handled somewhat differently. Depending upon the particular caching architecture employed, one of a variety of bus monitoring or "snooping" techniques may be used. One such technique involves the invalidation of cache entries which become "stale" or inconsistent with system memory after a DMA write to system memory occurs. Another technique involves the "write-back" to system memory of all dirty data within the cache memory prior to the actual writing of data by the alternate bus master. After the dirty data is written back to system memory, the contents of the entire cache are invalidated and the write by the alternate bus master may be performed. Since only a single copy of valid data remains in the system, the DMA write to system memory does not present the problem of possibly "stale" data in the cache.

FIG. 1 and FIGS. 2A–2C are provided to more clearly illustrate the problems associated with an incoherency between the cache memory and system memory during a DMA write operation as well as to illustrate a typical technique for maintaining the integrity of data when such a situation arises.

Referring first to FIG. 1, a block diagram is shown of a typical computer system 100 including a central processing unit (CPU) 102 coupled via a local CPU bus 104 to a cache memory 106 and a cache controller 108. A bus interface unit 110 provides an interface between a system bus 112 and the cache memory 106 and cache controller 108. A system memory 114 is coupled to the system bus 112 through a memory controller 116, and a disk memory unit 118 is coupled to the system bus 112 through a DMA controller 120.

The DMA controller 120 is an alternate bus master that allows data from disk memory unit 118 to be transferred directly into system memory 114 (via memory controller 116) without the supervisory control or intervention of CPU 102. Frequently it is desirable to transfer a relatively large block of data (i.e., 1 Kbyte or larger) from the disk memory unit 118 to system memory 114 during a single DMA request of the alternate bus master. Accordingly, the DMA controller 120 may initiate one or more burst transfer cycles on system bus 112 to sequentially transfer the desired block of data. As is well known to those of skill in the art, during the data phase of a burst cycle, a new word may be provided to system bus 112 from DMA controller 120 for several successive clock cycles without intervening address phases. The fastest burst cycle (no wait states) requires two clock cycles for the first word (one clock for the address, one clock for the corresponding word), with subsequent words returned from sequential addresses on every subsequent clock cycle. For systems based on the particularly popular model 80486 microprocessor, a total of four "doublewords" may be transferred for a given burst cycle.

FIGS. 2A–2C are block diagrams that illustrate the flow of data within computer system 100 when a DMA write operation occurs. As will be evident from the following description, the particular data transfers that occur are dependent upon the status of data (i.e., clean, dirty, invalid) within cache memory 106.

Referring to FIG. 2A, a DMA write operation is depicted for a situation wherein the DMA controller 120 desires to write a line of data 200 into a memory region 210 of system memory 114. In this example, line 200 consists of four words "A", "B", "C" and "D", and memory region 210 consists of four address locations "W", "X", "Y" and "Z". When the DMA write operation is initiated, an address tag comparison is made to determine whether cache memory 106 contains a line of data corresponding to the memory region 210 to which line 200 is to be written. If cache memory 106 does not contain a corresponding line, a cache miss occurs and the line 200 of data is transferred into system memory 114. This data transfer is accomplished by executing a single burst write cycle on system bus 112 to write the words "A", "B", "C", and "D" into address locations "W", "X", "Y", and "Z", respectively. Since the cache memory 106 in this situation does not contain a line corresponding to memory region 210, a data incoherency does not exist prior to the execution of or after completion of the data transfer. Therefore there is no need to write-back data or change the status of data within cache memory 106.

FIG. 2B illustrates a similar data transfer that is effectuated when a cache "hit" to "clean" data occurs within the cache memory 106 during a DMA write operation. As mentioned previously, a cache "hit" occurs when the cache memory 106 contains an associated line 220 corresponding to the memory region 210 of system memory 114 (into which data is to be written in accordance with the write instruction being executed). The "hit" line 220 is "clean" if it contains data that is identical to the corresponding data stored within memory region 210 of system memory 114. That is, line 220 is clean if its component words "E", "F", "G" and "H" are identical to the words stored within address locations "W", "X", "Y" and "Z", respectively. As illustrated in the figure, when such a DMA write occurs with clean data in the cache the line 200 is written into memory region 210 by executing a single burst write cycle on system bus 112. Similar to the previously described transfer of FIG. 2A, the words "A", "B", "C", and "D" are written into address locations "W", "X", "Y", and "Z", respectively. In this case, however, the line 220 residing within cache memory 106 no longer contains the most up-to-date information (i.e., the words "A", "B", "C", and "D" transferred into memory region 210 have become the new valid data). As a consequence, cache controller 108 invalidates the line 220.

Although the transfer of the line 200 into system memory 114 is accomplished by executing a burst write cycle that is predefined to transfer a total of four words per cycle, certain words within line 200 may be marked as invalid to inhibit them from being written into system memory 114. For example, the DMA controller 120 may require that only the words "A", "B" and "C" be accessed from disk memory unit 118 and may not request the fourth word "D". When the burst write cycle is initiated by DMA controller 120 to transfer the words "A", "B" and "C" into system memory 114, the fourth data transfer of the burst cycle involves indeterminate data that should not be stored within system memory 114. To deal with this situation, the DMA controller 120 marks the indeterminate data as invalid. When the invalid data is received by the memory controller 116, it is inhibited from being written into location "Z" of memory region 210. As a result, words "A", "B" and "C" are written into address locations "W", "X" and "Y", respectively, while the data previously stored at address location "Z" of memory region 210 remains unmodified and is not overwritten. The integrity of data within the system is thereby maintained.

FIG. 2C illustrates the data transfers of a DMA write operation that are effectuated when a cache "hit" occurs with respect to "dirty" data residing within cache memory 106. As mentioned previously, data within the cache is "dirty" if the data has been modified within the cache memory but not in system memory, thus creating a data incoherency. When such a situation arises, the line 200 is transferred into memory region 210 of system memory 114 by executing a burst transfer cycle. This transfer is identical to that described above in conjunction with FIGS. 2A and 2B. As will be explained in greater detail below, after line 200 is transferred into region 210, the line 220 of cache memory 106 is written back into memory region 210 of system memory 114. The write-back to system memory 114 of line 220 is accomplished by executing a second burst transfer cycle. In an alternative embodiment, the line 220 of cache memory 106 may be written back into memory region 210 of the system memory 114 prior to transferring line 200, to accomodate systems which overwrite stale cache lines. Following the write-back to system memory 114, the line 220 within cache memory 106 is marked as invalid.

A similar operation occurs when several words of the line 200 are invalid. For example, if words "A" and "D" are marked invalid, memory controller 116 inhibits them from being written into address locations "W" and "Z". When the write-back of the dirty line 220 within cache memory 106 is executed, memory controller 116 allows words "E" and "H" to be written into address locations "W" and "Z", respectively, and inhibits the writing of words "F" and "G" into address locations "X" and "Y". As a result, words "E", "B", "C" and "H" are stored within address locations "W", "X", "Y" and "Z", respectively, of memory region 160. Data integrity is again maintained.

In the computer system 100, the write-back of the dirty line 220 is executed during a DMA write cycle regardless of whether the transferred line 200 encompasses a complete set of valid data. For a situation in which words "A", "B", "C" and "D" of line 200 are all valid, however, the write-back of the dirty line 220 is actually unnecessary since any dirty data residing within the line 220 is effectively replaced (i.e., is invalidated) as a result of the DMA transfer of line 200. Therefore, although the write-back technique has been generally successful in maintaining the integrity of data where an incoherency exists between the cache memory and system memory prior to a DMA write operation, the bandwidth of the computer system 100 becomes limited since the system bus 112 is occupied with unnecessary bus traffic during the time when the line 220 is written back to system memory 114 (if line 220 contains a complete set of data). As a result, overall system performance may be degraded.

SUMMARY OF THE INVENTION

The problems outlined above are in large part solved by a cache-based computer system employing a snoop control circuit with write-back suppression according to the present invention. The snoop control circuit controls the write-back and invalidation of dirty data within a cache memory during a DMA write operation to maintain the integrity of data within the computer system. If an alternate bus master initiates a burst transfer cycle that does not encompass an entire line of valid data, the alternate bus master asserts a snoop write-back signal that causes the snoop control circuit to effectuate the write-back to system memory of a corresponding dirty line in the cache memory. Integrity of the data within the system is thereby maintained. On the other hand, if the alternate bus master initiates a burst transfer cycle that does encompass an entire line of valid data, the alternate bus master deasserts the snoop write-back signal. When the snoop write-back signal is deasserted, the snoop control circuit advantageously suppresses the write-back of the corresponding dirty data in the cache memory, thereby attaining reduced traffic on the system bus. Since the DMA operation involved the transfer of an entire line of valid data, the integrity of data is maintained even though the write-back of the dirty line was suppressed. As a result, the bandwidth of the computer system may be improved and the overall performance of the system may be enhanced.

Broadly speaking the present invention contemplates a computer system comprising a system bus, a cache memory coupled to the system bus, and a microprocessor coupled to the cache memory. A system memory controller is coupled to the system bus and to the system memory for controlling the storage and retrieval of data within the system memory. An alternative bus master device is coupled to the system bus, wherein the alternate bus master device is capable of asserting a snoop write-back signal if a complete line of data is not being transferred from the system memory to the system bus during a given burst write cycle and is capable of &asserting the snoop write-back signal if a complete line of data is being transferred from the system memory to the system bus during the burst write cycle. A cache controller is coupled to the cache memory and to the system bus for controlling the storage and retrieval of data within the cache memory. The cache controller includes a snoop control circuit for controlling the write-back to system memory of dirty data stored within the cache memory if the snoop write-back signal is asserted when a DMA write operation occurs. The snoop control circuit inhibits the write-back of dirty data to system memory if the snoop write-back signal is deasserted when DMA write operation occurs.

BRIEF DESCRIPTION OF THE DRAWINGS

Other objects and advantages of the invention will become apparent upon reading the following detailed description and upon reference to the accompanying drawings in which.

Figure 1:
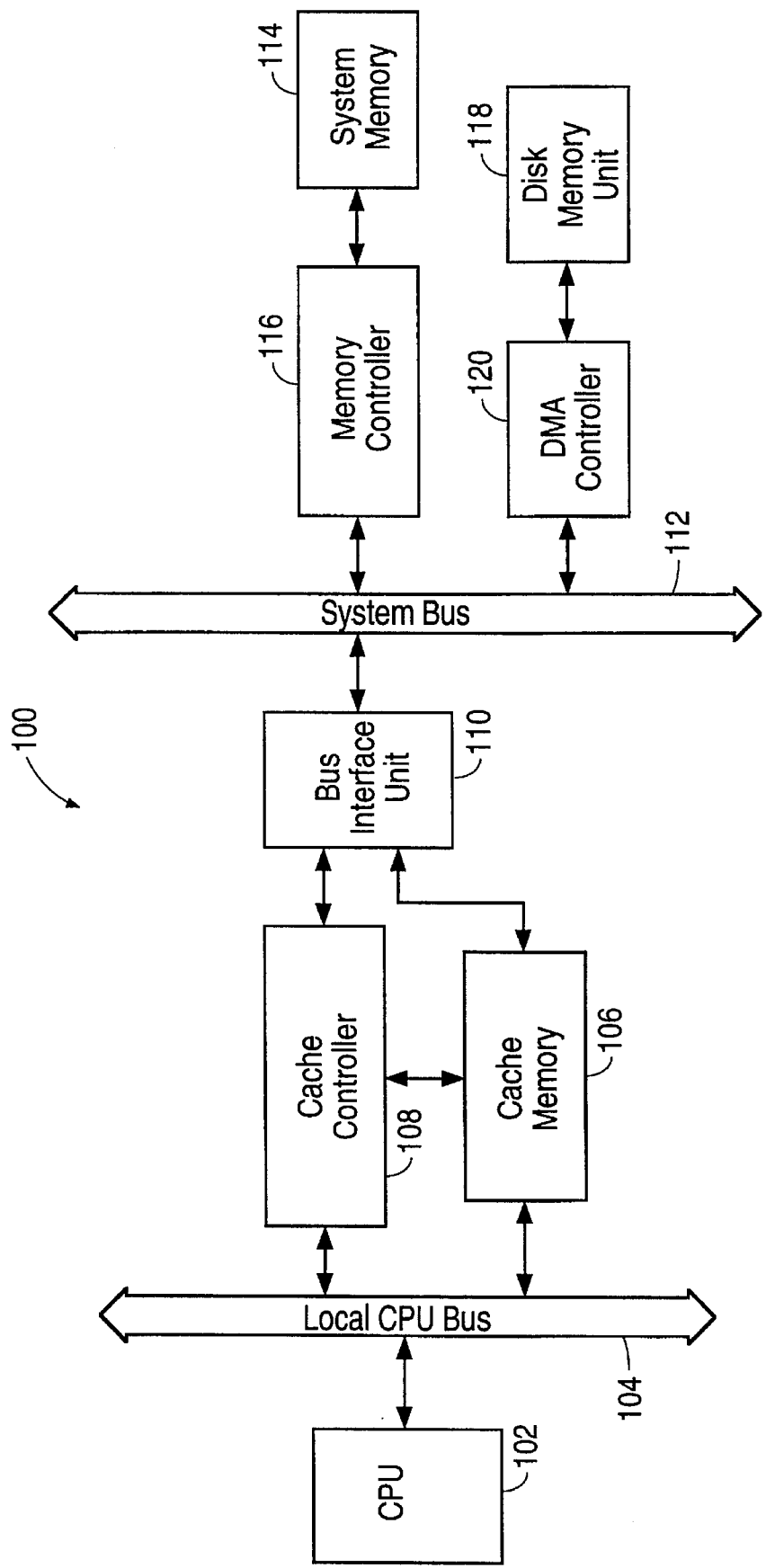
FIG. 1 is a block diagram that illustrates a typical cache-based computer system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 3:
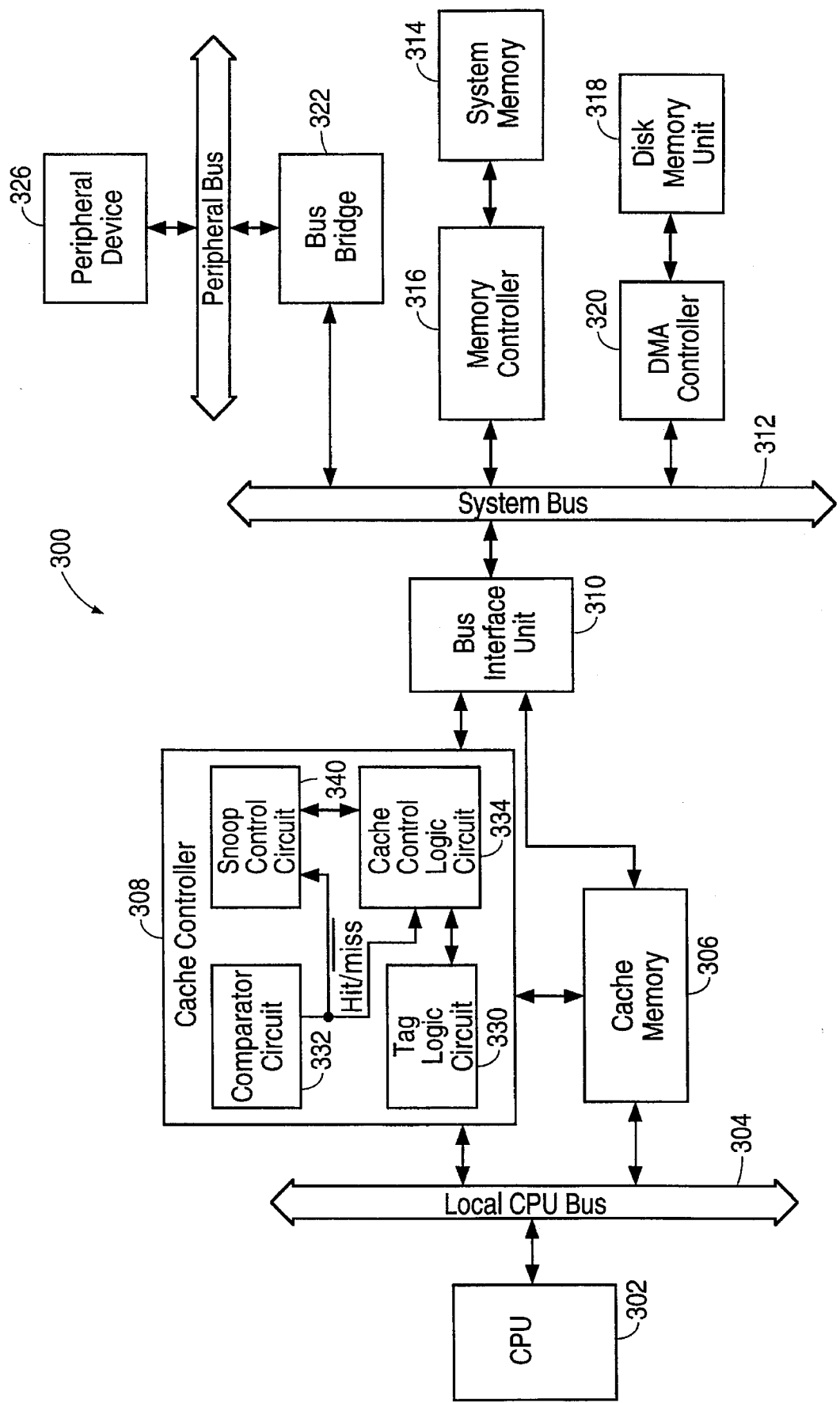
FIG. 3 is a block diagram that illustrates a cache-based computer system employing a snoop control circuit with write-back suppression in accordance with the present invention.

Turning now to FIG. 3, a block diagram is illustrated of a computer system 300 to which the present invention is adapted. The computer system 300 includes a central processing unit (CPU) 302 coupled via a local CPU bus 304 to a cache memory 306 and a cache controller 308. A bus interface unit 310 provides an interface between a system bus 312 and the cache memory 306 and cache controller 308. A system memory 314 is coupled to the system bus 312 through a memory controller 316, and a disk memory unit 318 is coupled to the system bus 312 through a DMA controller 230. A bus bridge 322 provides an interface between system bus 312 and a peripheral bus 324. A peripheral device 326 is finally shown coupled to peripheral bus 324.

In the illustrated form, computer system 300 embodies a single processor, single-cache architecture. It is understood, however, that the present invention may be adapted to multi-processor and/or multi-cache systems. It is further understood that a variety of other devices may be coupled to system bus 312, such as a bus arbiter.

Peripheral bus 324 may be any suitable bus for connection to peripheral devices such as CD-ROM units. Exemplary peripheral bus standards include the ISA (Industry Standard Architecture) bus and the EISA (Extended Industry Standard Architecture) bus.

CPU 302 is a data processing unit that implements a predetermined instruction set. Exemplary processing units include the model 80486 microprocessor as well as the Intel Pentium microprocessor. For situations in which the microprocessor includes an on-chip cache, such as in the model 80486 and Pentium microprocessors, cache memory 306 constitutes a secondary cache memory.

Cache controller 308 orchestrates the transfer of control signals between CPU 302 and bus interface unit 310, and further manages the transfer of data between CPU 302, cache memory 306 and bus interface tinit 310. In the preferred form, CPU 302, cache memory 306 and cache controller 308 operate concurrently to provide maximum sustained performance in the computer system.

System bus 312 has a predetermined bit width and is the computer system's primary bus. System memory 314 is a physical memory of a predetermined size and is implemented with DRAM (dynamic random access memory). Memory controller 316 controls and orchestrates the transfer of data, address and control signals communicating between system bus 312 and system memory 314.

Associated with each line of cache memory 306 is address tag and state information. The address tag indicates a physical address in system memory 314 corresponding to each entry within cache memory 306. The state information is comprised of a valid bit and a dirty bit. The valid bit indicates whether a predetermined cache line contains valid cache data, while the dirty bit identifies the write status of each cache line. In an invalid state, there is no data in the appropriate cache memory entry. In a valid (or "clean") state, the cache memory entry contains data which is consistent with system memory 314. In a dirty state, the cache memory entry contains valid data which is inconsistent with system memory 314. Typically, the dirty state results when a cache memory entry is altered by a write operation.

Cache controller 308 includes conventional circuitry that controls well-known caching functions such as read, write, update, invalidate and flush operations. This conventional circuitry includes a tag logic circuit 330 that contains the address tag and state information a comparator circuit 332 that generates a Hit/MISS signal, and a cache control logic circuit 334 that controls the writing and reading of data within cache memory 306. It will be appreciated by those skilled in the art that the cache control logic circuit 334 as well as other aspects of cache controller 308 including tag logic circuit 330 and comparator circuit 332 could be implemented using a variety of specific circuit configurations. Examples of such specific circuit configurations may be found in a host of publications of the known prior art, including U.S. Pat. Nos. 5,091,875 issued to Rubinfeld on Feb. 25, 1992 and 5,091,876 issued to Sachs et al. on Feb. 25, 1992. These patents are incorporated herein by reference in their entirety.

As illustrated in FIG. 3, cache controller 308 also includes a snoop control circuit 340 that controls the write-back and status of data within cache memory 306 during DMA write operations. As will be better understood from the following description, the snoop control circuit 340 detects the initiation of a DMA write cycle and controls the write-back of dirty data within cache memory 306 depending upon a snoop write-back signal generated by an alternate bus master. If the snoop write-back signal is asserted, a corresponding dirty line within cache memory 306 is written-back to system memory 314. If the snoop write-back signal is not asserted, the write-back operation is suppressed such that the corresponding dirty line within cache memory 306 is not written-back to system memory 314. The snoop write-back signal is asserted when the DMA write transfer does not encompass an entire cache line and is deasserted when the DMA write transfer encompasses a complete cache line.

Figure 2A:
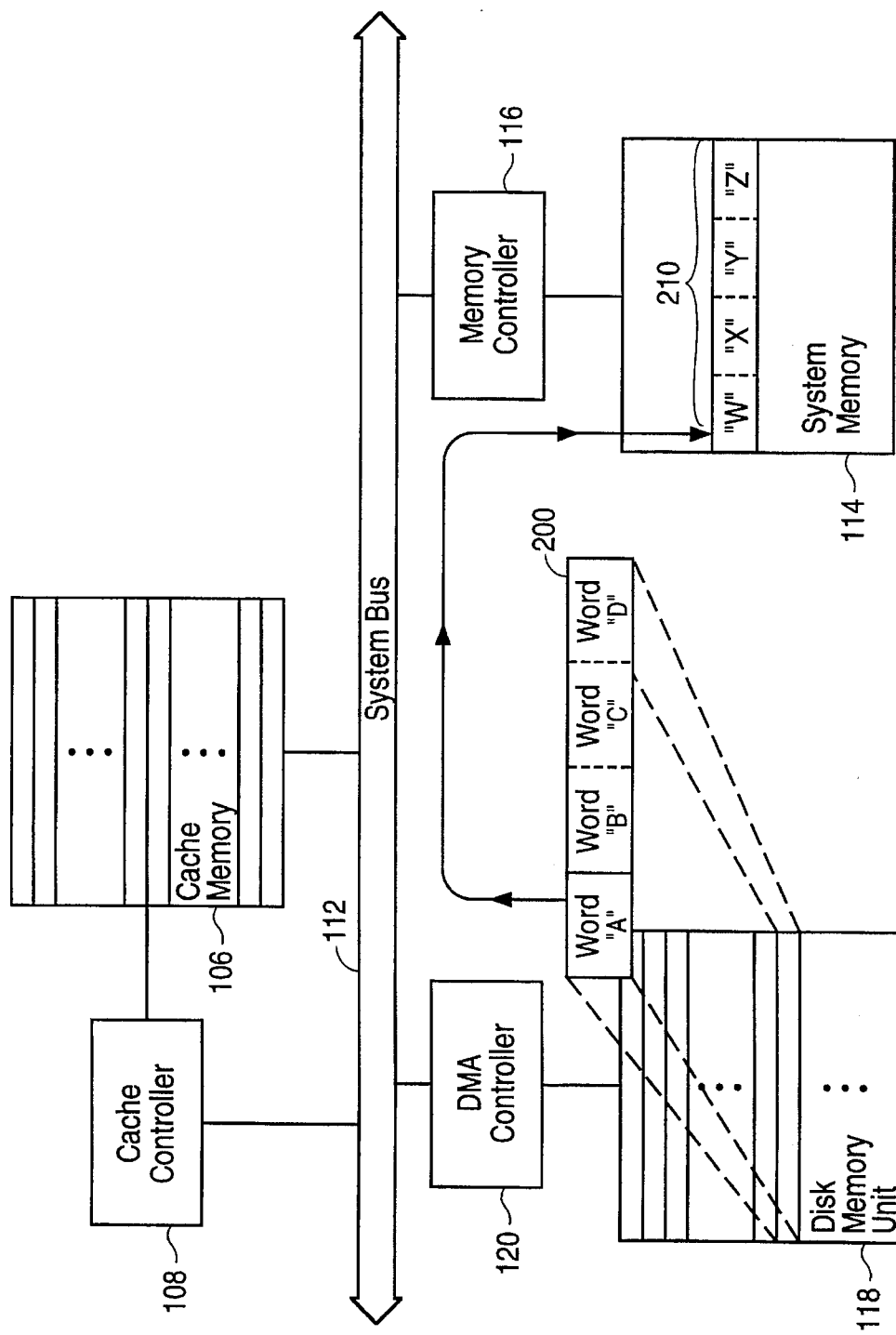
FIGS. 2A–2C are block diagrams that illustrate the flow of data within the computer system when a DMA write-operation occurs.
Figure 2B:
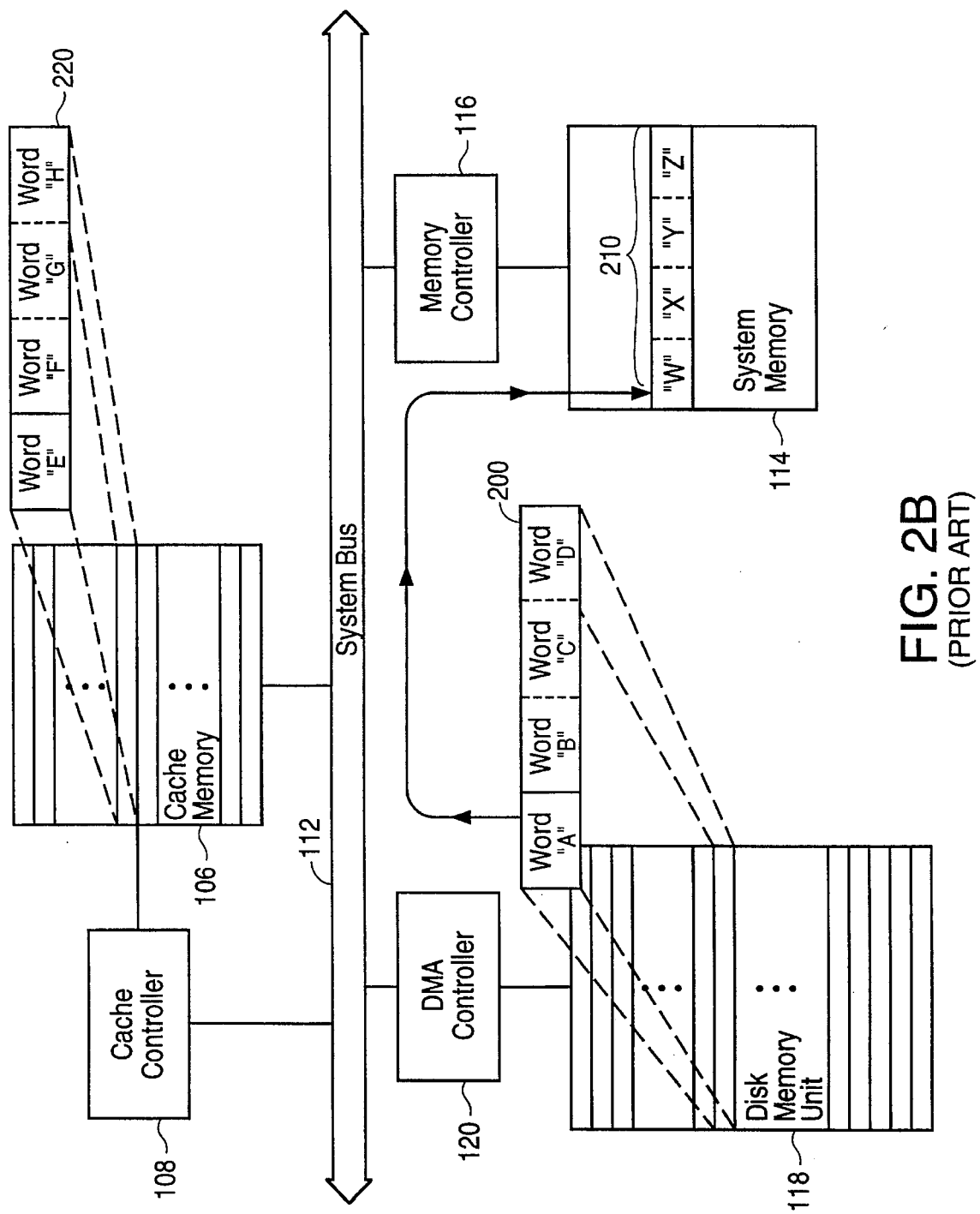
Figure 2C:
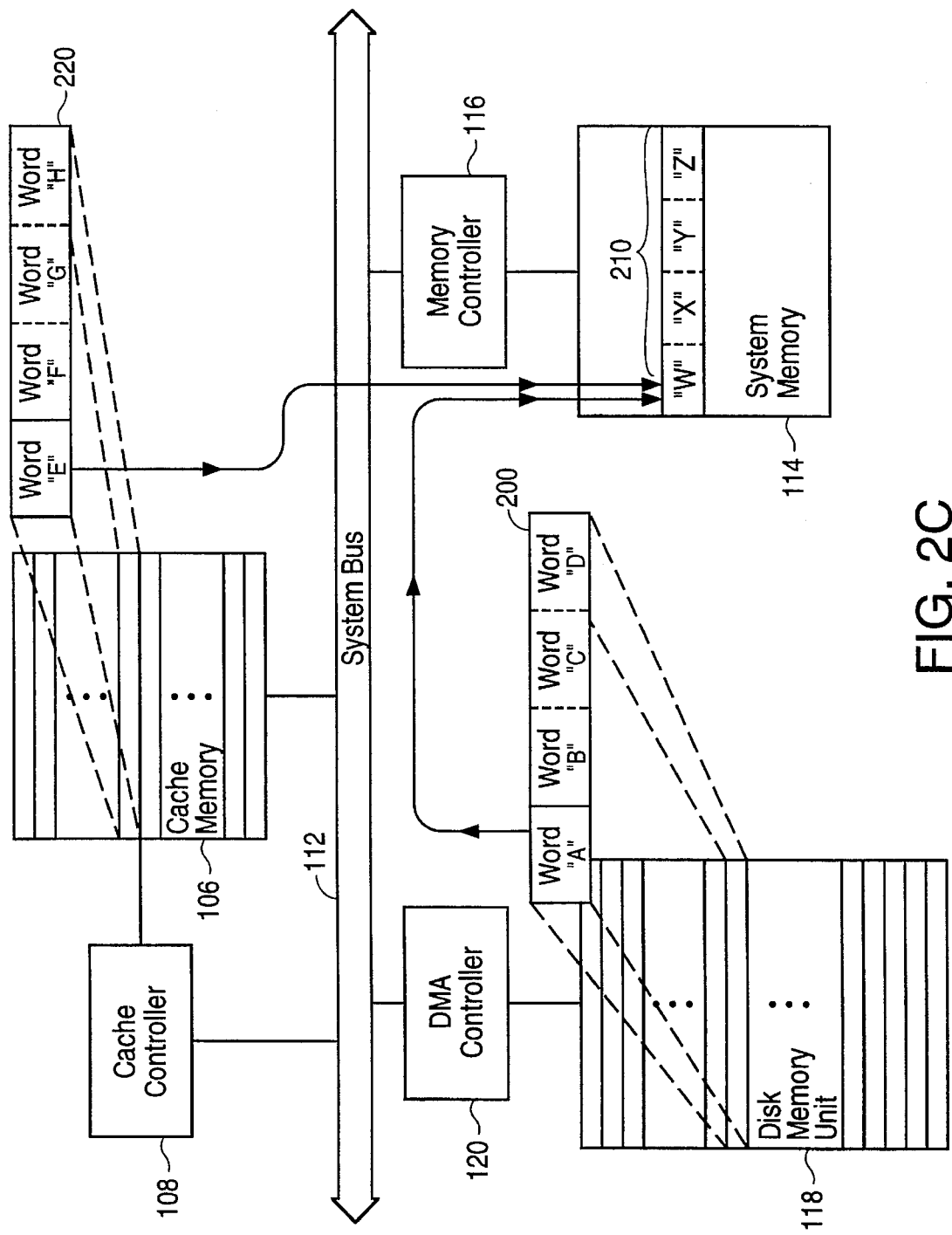
Figure 4A:
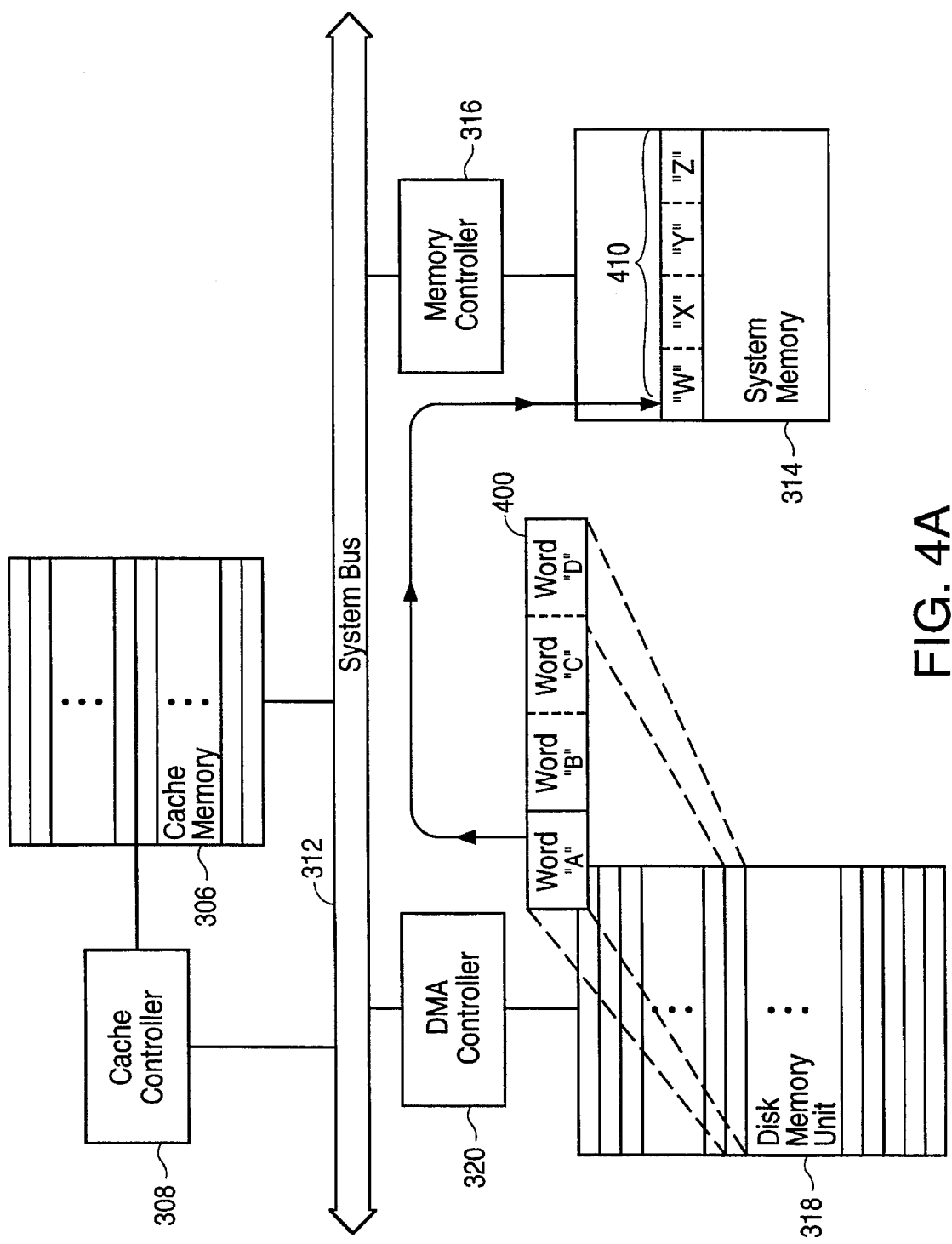
FIGS. 4A–4C are block diagrams that illustrate the flow of data within the computer system of FIG. 3.
Figure 4B:
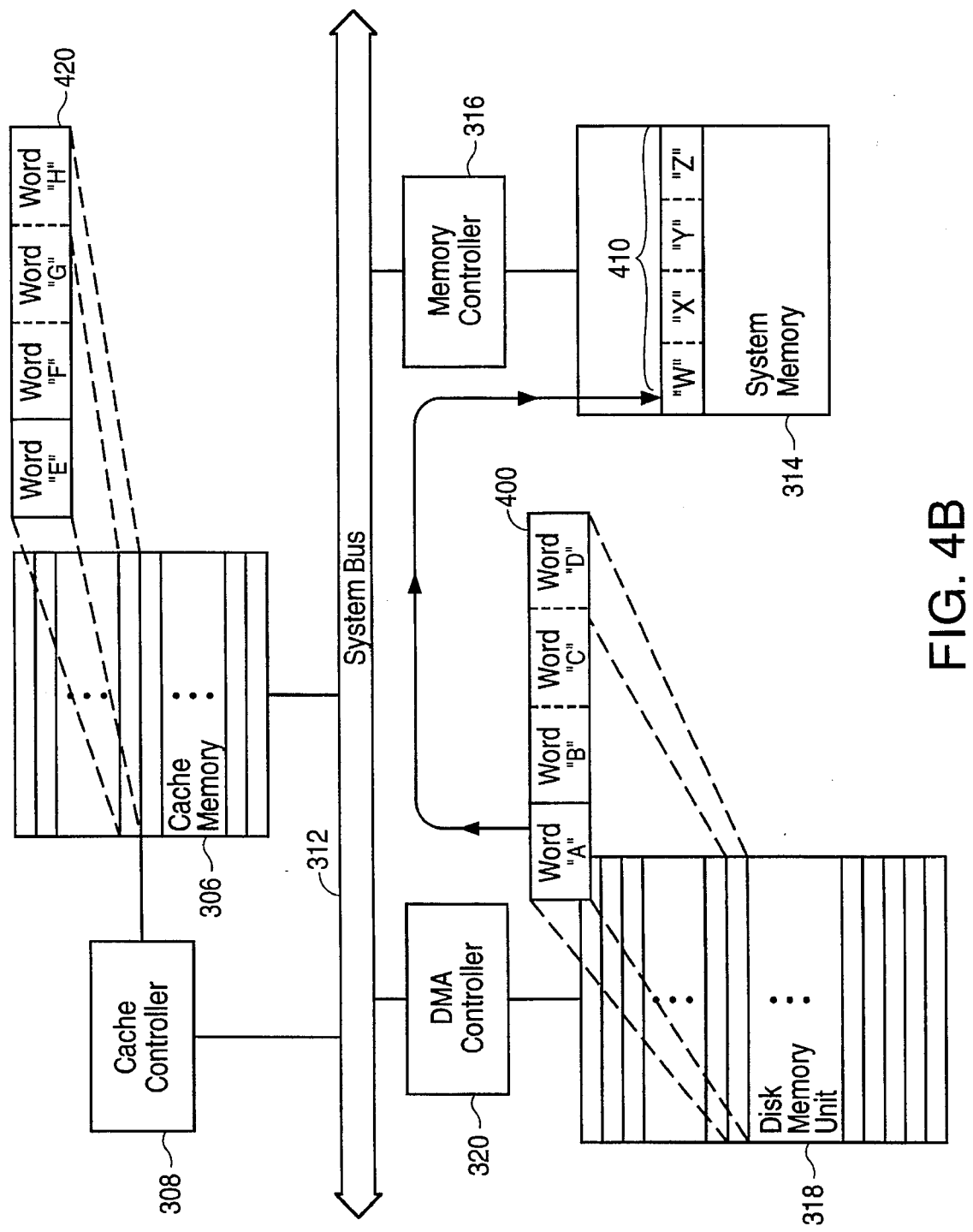
Figure 4C:
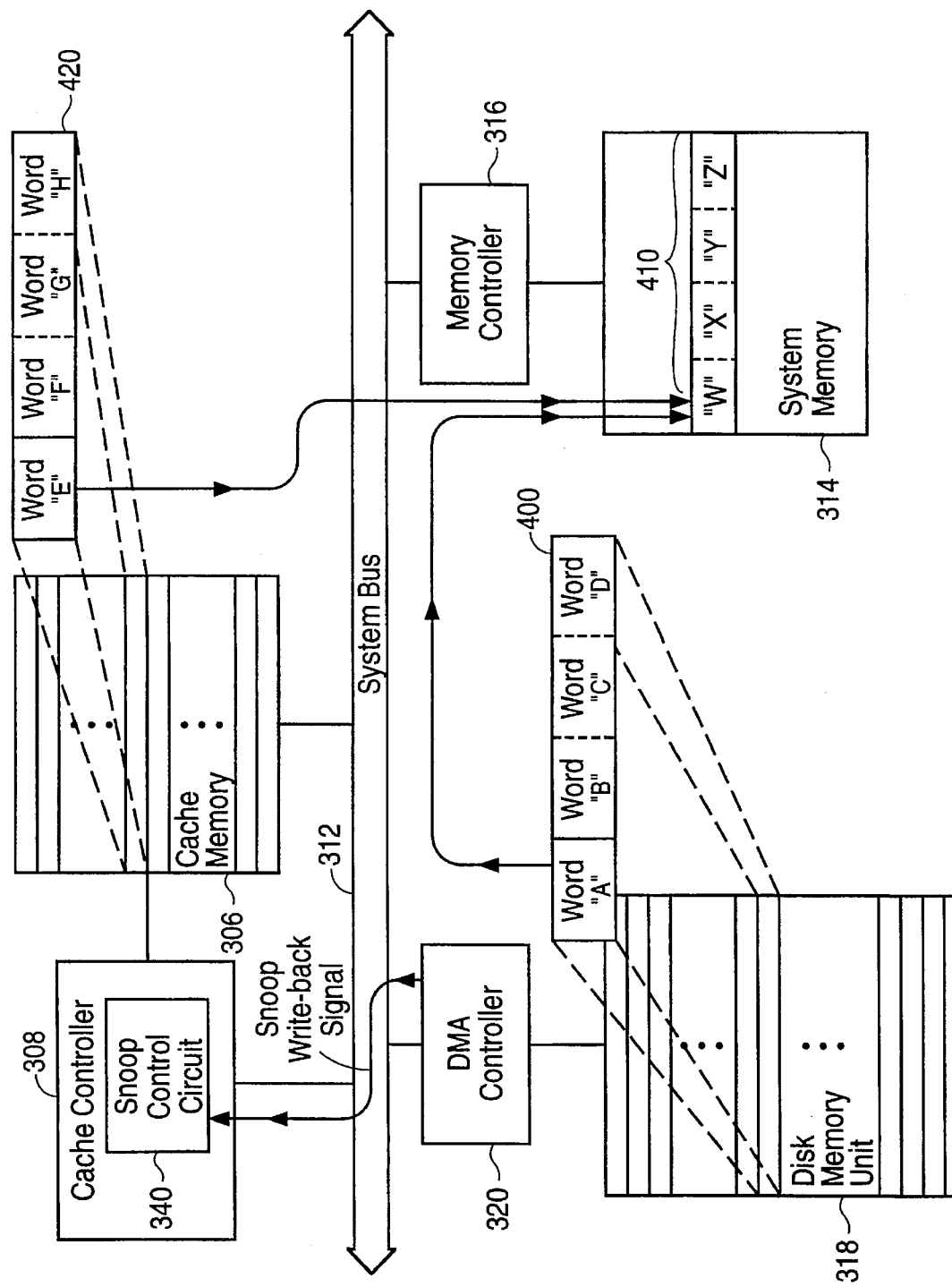

FIGS. 4A–4C are block diagrams that illustrate the flow of data within computer system 300 when a DMA write operation occurs. Similar to the system 100 described in conjunction with FIGS. 2A–2C, the particular data transfers that occur are dependent upon the status of data (i.e., clean, dirty, invalid) within cache memory 306. In computer system 300, however, the flow of data is also dependent upon the status of the snoop write-back signal.

Referring to FIG. 4A, a DMA write operation is depicted for a situation wherein the DMA controller 320 desires to write a line of data 400 into a memory region 410 of system memory 314. In this example, line 400 consists of four words "A", "B", "C" and "D", and memory region 410 consists of four address locations "W", "X", "Y" and "Z". When the DMA write operation is initiated, an address tag comparison is made to determine whether cache memory 306 contains a line of data corresponding to the memory region 410 to which line 400 is to be written. If cache memory 306 does not contain a corresponding line, a cache miss occurs and the line 400 of data is transferred into system memory 314. This data transfer is accomplished by executing a single burst write cycle on system bus 312 to write the words "A", "B"; "C", and "D" into address locations "W", "X", "Y", and "Z", respectively. Since the cache memory 306 in this situation does not contain a line corresponding to memory region 410, a data incoherency does not exist prior to the execution of or after completion of the data transfer. Therefore, there is no need to write-back data or change the status of data within cache memory 306. This data transfer is identical to that of FIG. 2A.

FIG. 4B illustrates a similar data transfer that is effectuated when a cache "hit" to "clean" data occurs within the cache memory 306 during a DMA write operation. As mentioned previously, a cache "hit" occurs when the cache memory 306 contains an associated line 420 corresponding to the memory region 410 of system memory 314. The "hit" line 420 is clean if it contains data that is identical to the corresponding data stored within memory region 410 of system memory 314. That is, line 420 is clean if its component words "E", "F", "G" and "H" are identical to the words stored within address locations "W", "X", "Y" and "Z", respectively. As illustrated in the figure, when such a DMA write occurs with clean data in the cache, the line 400 is written into memory region 410 by executing a single burst write cycle on system bus 312. Similar to the previously described transfer of FIG. 4A, the words "A", "B", "C", and "D" are written into address locations "W", "X", "Y", and "Z", respectively. In this case, however, the line 420 residing within cache memory 306 no longer contains the most up-to-date information (i.e., the words "A", "B", "C", and "D" transferred into memory region 410 have become the new valid data). As a consequence, cache controller 308 invalidates the line 420. This data transfer is identical to that of FIG. 2B.

It is noted that the operation of memory controller 316 of this embodiment is similar to the previously described operation of memory controller 116 of FIG. 1. Although the transfer of the line 400 into system memory 314 is accomplished by executing a burst write cycle that is predefined to transfer a total of four words per cycle, certain words within line 400 may be marked as invalid to inhibit them from being written into system memory 314. For example, the DMA controller 320 may require that only the words "A", "B" and "C" be accessed from disk memory unit 318 and may not request the fourth word "D". When the burst write cycle is initiated by DMA controller 320 to transfer the words "A", "B" and "C" into system memory 314, the fourth data transfer of the burst cycle involves indeterminate data that should not be stored within system memory 314. To deal with this situation, the DMA controller 320 marks the indeterminate data as invalid. When the invalid data is received by the memory controller 316, it is inhibited from being written into location "Z" of memory region 410. As a result, words "A", "B" and "C" are written into address locations "W", "X" and "Y", respectively, while the data previously stored at address location "Z" of memory region 410 is not overwritten. The integrity of data within the system is thereby maintained.

Operation of computer system 300 is next considered for the case in which line 420 is dirty. If a DMA write opoperation is initiated and corresponding dirty data exists within cache memory 306, the resulting data transfers are dependent upon the snoop write-back signal. If the write operation involves the transfer of a complete line 400 of data (i.e., if words "A", "B", "C" and "D" are all marked valid), the DMA controller 320 deasserts the snoop write-back signal. The snoop control circuit 340 of cache controller 308 is responsive to the snoop write-back signal and effectuates the write-back of the dirty line 420 only if the snoop write-back signal is asserted. Thus, if the snoop write-back signal is deasserted during the DMA write operation, after the line 400 is written into memory region 410 of system memory 314, the dirty line 420 is invalidated by the snoop control circuit 340. This data transfer is identical to that described above in conjunction with FIG. 4B. A subsequent write-back operation is not executed since the snoop write-back signal is deasserted. Since the words "A", "B", "C" and "D" of line 400 are all valid, their resulting transfer into address locations "W", "X", "Y" and "Z" of memory region 410 does not result in possible problems with data integrity. That is, since the DMA transfer encompasses the entire cache line 420, any dirty data within the line 420 is effectively replaced or invalidated as a result of the DMA transfer. There remains no possibility of data within the dirty line 420 that was not effectively replaced when the corresponding address locations "W", "X", "Y" and "Z" were overwritten.

FIG. 4C illustrates the data transfers of a DMA write operation that are effectuated when a cache "hit" occurs when corresponding "dirty" data resides within cache memory 306 and when the snoop write-back signal is asserted. When such a situation arises, the line 400 is transferred into memory region 410 of system memory 314 by executing a burst transfer cycle. After line 400 is transferred into region 410, the snoop control circuit 340 causes the dirty line 420 of cache memory 306 to be written back into memory region 410 of system memory 314. The write-back to system memory 314 of line 420 is accomplished by executing a second burst transfer cycle. As mentioned above, in an alternative embodiment, the line 420 of cache memory 306 may be written back into memory region 410 of the system memory 314 prior transferring line 400, to accomodate systems which overwrite stale cache lines. Following the write-back to system memory 314, the line 420 within cache memory 306 is marked as invalid.

The case in which words "A", "B" and "C" of line 400 are valid and word "D" is marked by DMA controller 320 as invalid. When line 400 is transferred to system memory 314 during a DMA write, the memory controller 316 effectuates the write of the valid words "A", "B" and "C" into address locations "W", "X" and "Y", respectively, of memory region 410. However, the memory controller 316 inhibits word "D" from being written into address location "Z" of system memory 314 since it is marked as invalid. If the "hit" cache line 420 is "dirty", it is possible that word "H" of cache line 420 is modified with respect to the data stored within address location "Z" of system memory 314. As such, word "H" would be the most up-to-date information with respect to that memory location. Thus, to maintain the integrity of the data in the system, ethe entire line 420 of cache memory 306 is written back to system memory 314. When the line 420 is written back, memory controller 316 allows word "tt" of line 420 to be written into address location "Z" of system memory 314 but inhibits words "E", "F" and "G" from being written into system memory 314. As a result, words "A", "B", "C" and "H" are stored within address locations "W", "X", "Y" and "Z", respectively, of memory region 410.

Figure 5:
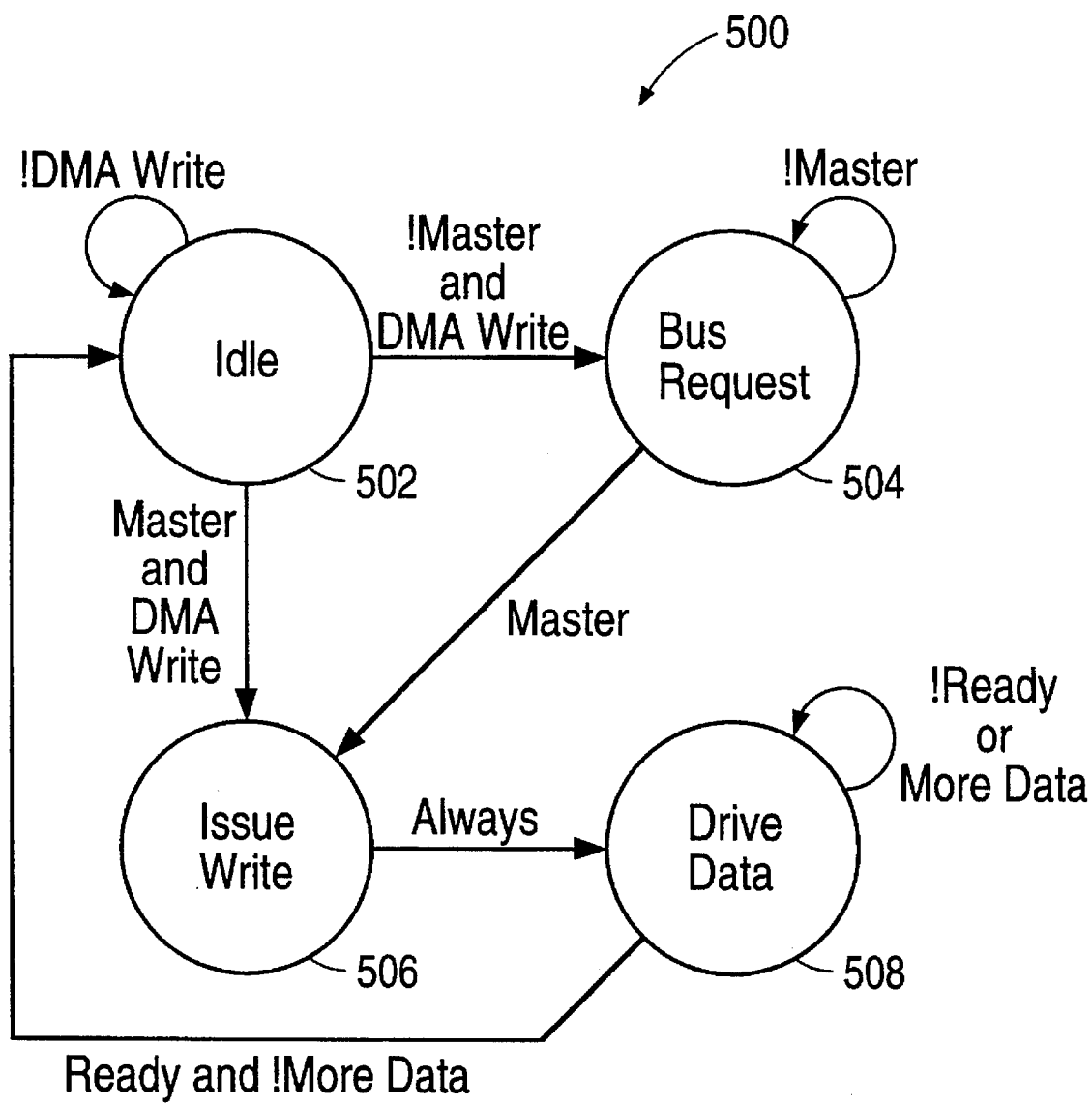
FIG. 5 is a diagram of an algorithmic state machine incorporated within a DMA controller of the computer system of FIG. 3.

FIG. 5 is a diagram of an algorithmic state machine 500 incorporated as an integral part of DMA controller 320. The algorithmic state machine 500 controls the write of data from the disk memory unit 318 and asserts the snoop write-back signal when appropriate.

Referring collectively to FIGS. 3 and 5, the state machine 500 remains in an idle state 502 until a DMA write request occurs. Upon the occurrence of a DMA write request, state machine 500 makes a transition to state 504 if the system bus 312 is presently occupied. During state 504, state machine 500 requests mastership of system bus 312. Once mastership of the system bus 312 is granted by, for example, a bus arbiter, state machine 500 enters state 506. During state 506, the DMA controller 320 issues a burst cycle on system bus 312 to write the requested line of data to system memory 314. The DMA controller 320 further asserts the snoop write-back signal if the write transfer does not encompass the entire cache line. The state machine 500 then enters a state 508 wherein the DMA controller provides the data to the system bus 312 in accordance with the burst cycle. After all the data has been driven on system bus 312, state machine 500 reverts back to idle state 502.

Figure 6:
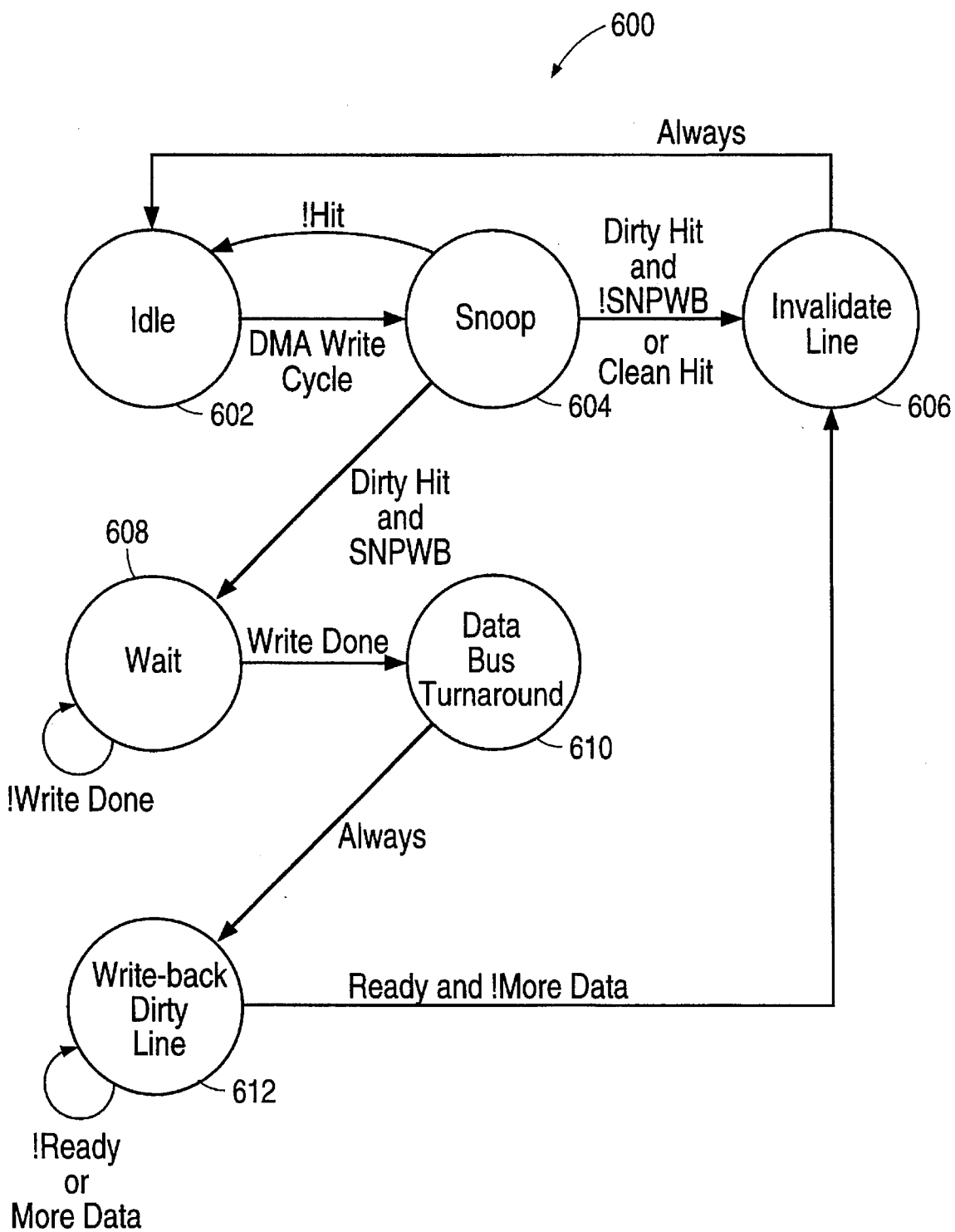
FIG. 6 is a diagram of an algorithmic state machine embodied within a snoop control circuit with write-back suppression in accordance with the present invention.

FIG. 6 is a diagram of an algorithmic state machine 600 embodied as an integral part of the snoop control circuit 340 within cache controller 308. The algorithmic state machine 600 controls the write-back and invalidation of data within cache memory 306 during the DMA write operation and is responsive to the snoop write-back signal asserted by state machine 500. Referring collectively to FIGS. 3 and 6, state machine 600 remains in an idle state 602 until the occurrence of a DMA write cycle is detected on system bus 312. When such an occurrence is detected, state machine 600 makes a transition to a snoop state 604. During state 604, an address tag comparison is made to determine whether a cache "hit" has occurred (i.e., whether cache memory 306 contains data having an address corresponding to the data to be written by DMA controller 316), and whether the cache line is dirty. If a cache hit has not occurred, state machine 600 reverts back to idle state 602.

If a "hit" to a line within cache memory 306 occurs (as detected during state 604), the next state depends upon whether the line within cache memory 306 is dirty or clean and upon the status of the snoop write-back signal. If a hit to a clean line within cache memory 306 occurs, state machine 600 enters a state 606. During state 606, the hit cache line is invalidated and state machine 600 reverts back to idle state 602.

If a hit to a dirty line within cache memory 306 occurs, state machine 600 enters state 606 if the snoop write-back signal is not asserted. Again, during state 606, the cache line is invalidated and state machine 600 reverts back to idle state 602.

On the other hand, if a hit to a dirty line within cache memory 306 occurs and the snoop write-back signal is asserted, state machine 600 enters state 608. State machine 600 waits during state 608 until the DMA controller 320 writes the associated line of data into system memory 316. After the DMA write to system memory completes, an additional clock cycle is generated during a state 610 to prevent the data bus drivers from contending. State machine 600 then enters a state 612 in which the dirty line from cache memory 306 is written back to system memory 314 and merged into the line previously transferred by DMA controller 316. After the dirty line from cache memory 306 is written back to system memory 314, the cache line is invalidated during state 606 and subsequently state machine 600 reverts back to idle state 602.

Although in the above described embodiment the DMA controller 320 serves as an alternate bus masters that asserts a snoop write-back signal, other devices could also be configured as similar alternate bus masters. For example, bus bridge 322 could incorporate a state machine 500 and generate a snoop write-back signal in a manner similar to that described above. In the following description although a DMA write cycle is explained for the specific case in which the DMA controller 320 is serving as the alternate bus master, it is understood that bus bridge 322 and a variety of other devices could serve as equivalent bus masters.

The algorithmic state machines 500 and 600 may be reduced to sequential logic circuits by employing a variety of well known circuit techniques. For example, sequential logic circuitry that implements state machines 500 and 600 may be attained in accordance with the state reduction techniques taught within the publication *Digital Design* by M. Morris Mano, Prentice-Hall, Inc., pgs. 220–236; and within the publication *Digital Computer Fundamentals— Sixth Edition* by Thomas Bartee, McGraw-Hill Book Company, pgs. 170–175. These publications are incorporated herein by reference.

Computer-aided design tools may alternatively be employed to reduce the state machines 500 and 600 to sequential logic circuitry. Exemplary computer-aided design tools include the behavioral language Verilog as well as the VHSIC hardware description language.

It is noted that the present invention may be implemented in conjunction with a variety of other bus transfer techniques and alternative system configurations. For example, the present invention may be implemented in conjunction with systems employing either non-pipelining or pipelining techniques. Similarly, the present invention may be implemented within multi-processor and/or multi-cache systems.

Numerous variations and modifications will become apparent to those skilled in the art once the above disclosure is fully appreciated. For example, the number of words that comprise a predefined line within the cache memory may vary without departing from the spirit and scope of the present invention. It is intended that the following claims be interpreted to embrace all such variations and modifications.

What is claimed is:

1. A computer system comprising:

a system bus;

a cache memory coupled to said system bus;

a microprocessor coupled to said cache memory;

a system memory;

a system memory controller coupled to said system bus and to said system memory for controlling the storage and retrieval of data within said system memory;

an alternate bus master device coupled to said system bus, wherein said alternate bus master device is configured to assert a snoop write-back signal if a complete line of data is not being transferred to said system memory from said alternate bus master during a given burst write cycle and is configured to deassert said snoop write-back signal if a complete line of data is being transferred to said system memory from said alternate bus master device during said burst write cycle; and cache controller coupled to said cache memory and to said system bus for controlling the storage and retrieval of data within said cache memory, wherein said cache controller includes a snoop control circuit for controlling the write-back to said system memory of dirty data in the associated hit line stored within said cache memory if said snoop write-back signal is asserted when a DMA write operation occurs to said system memory from said alternate bus master device, and wherein said snoop control circuit inhibits the write-back of said dirty data to said system memory if said snoop write-back signal is deasserted when said DMA write operation occurs.

2. The computer system as recited in claim 1 wherein said alternate bus master device is a DMA controller.

3. The computer system as recited in claim 1 wherein said alternate bus master device is a bus bridge.

4. The computer system as recited in claim 1 wherein said snoop control circuit invalidates a line of dirty data stored within said cache memory during said DMA write operation.

5. The computer system as recited in claim 1 wherein said write-back to said system memory of said dirty data stored within said cache memory occurs after selected data is transferred during said given burst cycle from said alternate bus master device to said system memory.

6. The computer system as recited in claim 1 wherein said write-back to said system memory of said dirty data stored within said cache memory occurs before selected data is transferred during said given burst cycle from said alternate bus master device to said system memory.

7. The computer system as recited in claim 1 wherein the write-back to said system memory of said dirty data stored within said cache memory is completed during a burst write cycle to said system memory.

8. A snoop control method for a cache-based computer system including a cache memory coupled to an alternate bus master and a system memory through a system bus, said method comprising the steps of:

initiating, by said alternate bus master, a DMA write cycle to transfer data from said alternate bus master to said system memory;

asserting, by said alternate bus master, a snoop write-back signal to a snoop control circuit within a cache controller coupled to said cache memory and said system bus if the DMA transfer does not encompass a complete cache line, and deasserting said snoop write-back signal if the DMA transfer encompass a complete cache line;

invalidating, by said cache controller, an associated hit line within said cache memory; and writing back, by said cache controller, the associated hit line to a system memory controller coupled to said system memory if the snoop write-back signal is asserted, and not writing back the associated hit line to said system memory controller if the snoop write-back signal is deasserted.

* * * * *

UNITED STATES PATENT AND TRADEMARK OFFICE
CERTIFICATE OF CORRECTION

PATENT NO. : 5,623,633
DATED : Apr. 22, 1997
INVENTOR(S) : Zeller et al.

It is certified that error appears in the above-identified patent and that said Letters Patent is hereby corrected as shown below:

Column 1, line 13, delete "modem-" and insert --modem---;

Column 5, line 56, delete "&asserting" and insert --deasserting--; *and*

Column 10, line 5, delete "ethe" and insert --the--.

Signed and Sealed this

Twelfth Day of May, 1998

Attest:

BRUCE LEHMAN

*Attesting Officer*      *Commissioner of Patents and Trademarks*